July 31, 1962  W. M. KAUFFMANN ET AL  3,046,965
VALVE SEAT ASSEMBLY
Filed July 6, 1961

FRANK E. CARTER
WILLIAM M. KAUFFMANN
INVENTORS

BY Daniel H. Bobis
Atty

United States Patent Office 3,046,965
Patented July 31, 1962

3,046,965
VALVE SEAT ASSEMBLY
William Martin Kauffmann, Hamburg, and Franklin E. Carter, East Aurora, N.Y., assignors to Worthington Corporation, Harrison, N.J., a corporation of Delaware
Filed July 6, 1961, Ser. No. 122,269
6 Claims. (Cl. 123—188)

This invention relates generally to valve seat assemblies. More particularly the invention relates to valve seat assemblies for internal combustion engines employing poppet valves for controlling entrance of intake air and the exhaust gas released from the engine cylinder.

To extend the life of internal combustion engines it has been found advantageous to employ valve seat inserts. The most common valve inserts are the snug fitting insert and the loose fitting insert. However, under operating conditions of the engine the use of such inserts has been found unsatisfactory.

The use of the snug fitting insert has created tensile stress problems in the cylinder as the operating temperatures increase due to the expansion of the insert. These stresses set up by the valve seat inserts will produce tensile stresses in the cylinder head of sufficient magnitude to frequently exceed the ultimate strength of the material which will cause cracking and may require replacement of the cylinder head.

The use of loose fitting valve inserts which expand to engage the cylinder under normal operating conditions of the engine are initially held in position by snap rings. This solves the overstressing of the cylinder problem but has created additional problems. These problems relate to the excessive wear of the inserts at lower than operational temperatures and the necessity of employing shims with the inserts when grinding the seat surface thereon.

The object of the present invention is to produce a novel valve seat insert which will eliminate the above described difficulties while achieving the benefits of increased valve seat life.

In accordance with the present invention a valve seating device in a cylinder of an internal combustion engine is provided with a valve port having a counterbore therein to receive the valve insert. The valve insert is received in the counterbore and has an upper portion and a lower portion with the upper portion of substantially larger external diameter than the lower portion. The diameter of the counterbore and the upper portion of the valve insert is substantially equal. The upper portion of the valve insert is disposed in the counterbore in close engagement therewith to permit said insert to seat in alignment thereto. Means are provided in the valve insert and engage in the counterbore to urge the valve insert to seat in the counterbore.

One of the objects of this invention is to provide a valve seat insert with increased ability to transfer heat thereby permitting cooler seat temperatures.

Another object of this invention is to provide a valve seat insert with improved means for alignment to facilitate grinding of seat surfaces.

Still another object of this invention is to provide valve seat inserts with increased surface life.

With these and other objects in view as may appear from the accompanying specification the invention consists of various features of construction and combination of parts which will be first described in connection with the accompanying drawings showing a valve seat assembly of a preferred form embodying the invention and the features forming the invention will be specifically pointed out in the claims.

Figure 1:
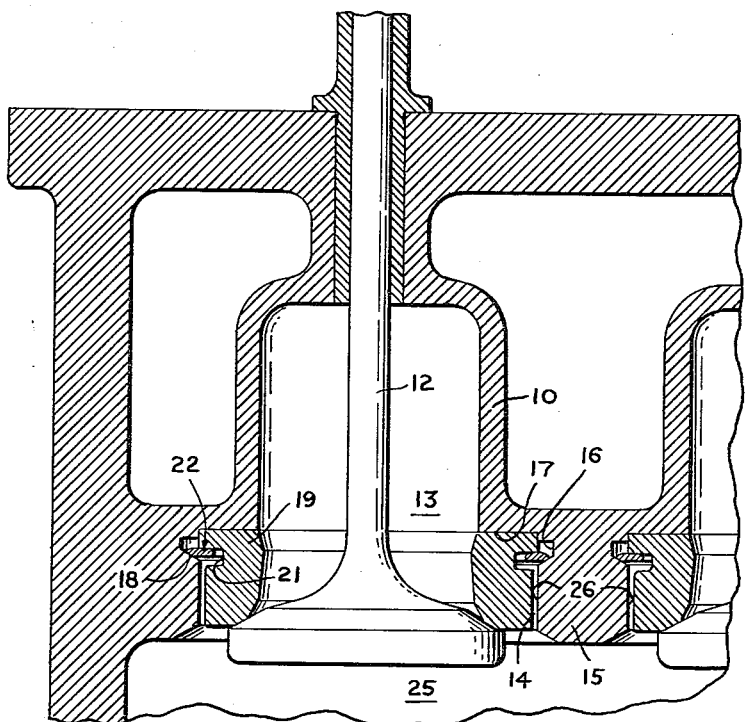
FIGURE 1 is a fragmentary section through the cylinder head of an internal combustion engine showing the improved seat insert in place.

Referring more particularly to the drawings, FIGURE 1 indicates a section of the cylinder head of an internal combustion engine comprising the cylinder head 10 having a poppet valve 12 therein to control the entrance of intake air and the exhaust gas released from the engine cylinders.

As previously pointed out hereinabove it is necessary to save the expense of frequent new cylinder heads to provide valve seat inserts against which the poppet valve 12 seats which inserts are made of various types of metal having greater resistance to wear than the metal of which the cylinder head 10 is formed. When the engine is in operation the temperature of the valve seat ring will always be higher than the temperature of the cylinder head or cylinder into which it fits because most of the cooling of the valve seat ring is by conduction to the cylinder head or cylinder in which it fits and therefore the valve seat ring will have a greater degree of expansion than the cylinder head or cylinder. The present invention takes advantage of this condition and also provides for the aligning of the valve insert so that it is firmly held in position under all operating conditions of the engine, regardless of the temperature of the valve insert.

Referring to FIGURE 1 it can be seen that the valve port 13 extends inwardly from the exterior opening 25 in the face of the valve deck 15 of the cylinder head 10 and has a counterbore 14 therein. The counterbore has a wall of uniform diameter extending from the exterior opening 25 in the face of the valve deck 15 inwardly to the inner edge 17 of the counterbore 14. The wall 26 of the counterbore 14 is provided with an inner end 40 and an outer end 41 and an annular groove 16 disposed therebetween. The annular groove 16 having a chamfered edge 18 for the purpose hereinafter described.

Figure 2:
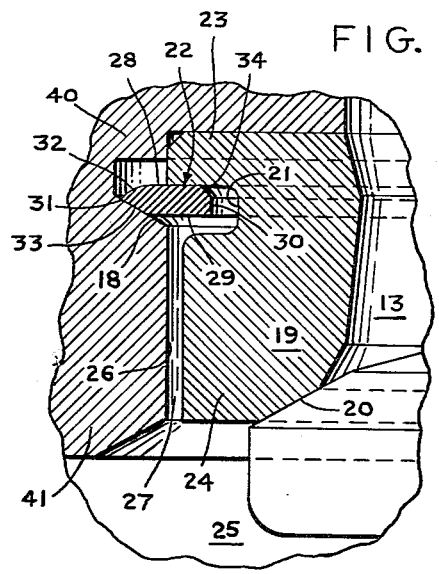
FIGURE 2 is an enlarged fragmentary view illustrating the feature of the valve seat insert alignment and the clearance between itself and the wall of the counterbore in the engine cylinder head.

The valve seat insert 19 as shown in FIGURE 2 is an annular ring having a valve seat 20 formed thereon and provided with an annular groove 21 therein which receives a split expansion ring 22. The split expansion ring 22 will be more fully described hereinafter.

The valve seat insert 19 is provided with an upper portion 23 adjacent the inner end 40 of the counterbore 14 and a lower portion 24 adjacent outer end 41 of the counterbore 14. The valve insert 19 is provided with a periphery 42 formed by an upper portion 23 and a lower portion 24. The upper portion 23 and the lower portion 24 of the valve insert 19 are separated by the annular groove 21. The upper portion 23 of the valve insert 19 has a slightly larger diameter than that of the lower portion 24. The upper portion 23 of the valve insert 19 is provided with a diameter substantially equal to that of the counterbore 14, but it is understood that the upper portion 23 of the valve insert 19 may have a larger diameter than the counterbore 14 to form a press fit therebetween as described hereinafter.

The valve insert 19 is received into the counterbore 14 and the upper portion 23 thereof engages the wall 26 of the counterbore 14 to align the valve insert 19 in the counterbore 14. The lower portion of the valve insert 19 is of smaller diameter than the counterbore 14 but under normal operating temperatures will expand to engage the wall 26 of the counterbore 14. The inner portion 23 of the valve seat insert 19 will operate at a maximum temperature of 450° F. and the maximum temperature of the seat 20 of the valve insert 19 will be 600° F.

The difference of diameters of the wall 26 of the counterbore 14 and the lower portion 24 of the valve seat insert 19 establishes a clearance 27 which is present only when the valve seat insert 19 is below normal operating temperatures. It is understood that the clearance 27 is accurately determined so that when the valve seat insert heats up during operation of the engine it will expand sufficiently to form a firm contact with the wall 26 of the counterbore 14.

Figure 3:
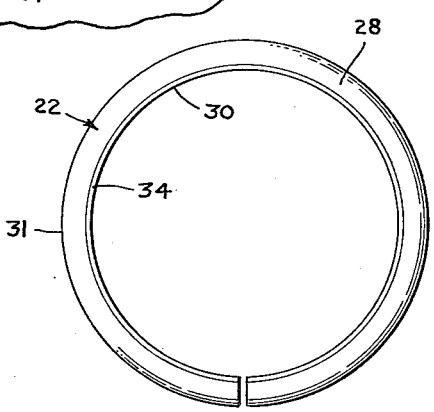
FIGURE 3 is a plan view of the expansion or piston ring employed to urge the valve insert to seat in the valve port.

Referring now to the spring expansion ring 22 shown in FIGURES 2 and 3 it can be seen that the spring expansion ring 22 has an upper side 28 adjacent the upper portion 23 of the valve seat insert 19 and a lower side 29 adjacent the lower portion 24 of the valve seat insert 19. The ring 22 has an inner edge 30 and an outer edge 31. The inner edge 30 has a beveled upper part 34 adjacent the upper side 28 of the ring 11. The outer edge 31 has an upper part 32 adjacent the upper side which is in the form of an arc and a lower part 33 adjacent the lower side 29 of the ring 22 which is beveled to an incline substantially equal to that of chamfered edge 18 of the annular groove 16 of the counterbore 14. The chamfered edge 18 and the lower part 33 of the ring 22 are beveled at an incline of substantially 30°, but it is understood that the angle of incline may be varied without departing from the scope of the invention.

The spring expansion ring 22 may be an ordinary piston ring such as used in the pistons of internal combustion engines being a split spring ring as shown in FIGURE 3 and has a preferred depth of ⅛ the total depth of the periphery of the valve insert 19.

When the insert 19 is placed in the counterbore 14 and the spring expansion ring 22 snaps into the annular groove 16 of the counterbore 14 and lower part 33 of the ring 22 engages the chamfered edge 18. The upper part 34 of the inner edge 30 being beveled unbalances the ring 22 so that the lower part 33 of the outer edge 31 bears on the chamfered edge 18 of the annular groove 16 in the counterbore 14. Thus, the engagement of the beveled edges will urge the valve seat insert 19 inwardly against the inner edge 17 of the counterbore 14 and will firmly hold the valve seat insert 19 in position in the counterbore 14.

While in the drawings and in the above specific description the valve seat insert is shown inserted in the cylinder head of an internal combustion engine, it is understood that the present invention embraces construction wherein the valve seat insert is inserted in the cylinder of an engine and in the claims the use of the word cylinder is to be understood to embrace either the cylinder proper or its part, a cylinder head.

It will be understood that the invention is not to be limited to the specific construction or arrangement of parts shown but that they may be widely modified within the invention defined by the claims.

What is claimed is:

1. A valve seating device in a cylinder of an internal combustion engine comprising, a valve port having a counterbore, said counterbore having an annular groove, a valve insert in the counterbore, said insert having an upper portion and a lower portion, said upper portion of substantially larger diameter than said lower portion and separated therefrom by an annular groove, a split expansion ring in the annular groove in said valve insert and engaging in the annular groove in the counterbore to urge the insert to seat in the counterbore, said upper portion of said insert of substantially equal diameter to that of the counterbore and in close engagement therewith to permit said insert to seat in alignment thereto.

2. A valve seating device in a cylinder of an internal combustion engine comprising a valve port having a counterbore of substantially uniform diameter and extending inwardly from the valve port exterior to the inner edge of the counterbore, the counterbore having an inner end and an outer end adjacent the valve port exterior, an annular groove in the counterbore in the inner end thereof and in spaced relationship with the inner edge of the counterbore, the annular groove of the counterbore extending inwardly therefrom, an annular insert received in the counterbore, said insert having a periphery divided into an upper portion and a lower portion, said upper portion adjacent the inner end of the counterbore and said lower portion adjacent the outer edge of the counterbore, said upper portion of said insert having a slightly larger diameter than said lower portion thereof, an annular groove disposed on the periphery adjacent the upper portion and extending inwardly from the periphery, the annular groove of said insert adjacent the annular groove of the counterbore, a split expansion ring in the annular groove in said insert and engaging in the annular groove in the counterbore to urge said insert to seat in the counterbore, said upper portion of said insert and the counterbore of substantially equal diameters, said upper portion of said insert in close engagement with the counterbore to permit said insert to seat in alignment thereto.

3. The combination claimed in claim 2 wherein
(a) the annular groove in the counterbore has a chamfered outer edge,
(b) said expansion ring has a beveled edge of substantially the same incline as the chamfered outer edge of the annular groove and on engagement therewith said ring to urge said insert to seat in the counterbore,
(c) said expansion ring unbalanced in the direction of the counterbore to bear against the chamfered outer edge of the groove.

4. The combination claimed in claim 3 wherein said upper portion of said insert received in the inner end of the counterbore to form a press fit therebetween to permit said insert to seat in alignment with the counterbore.

5. The combination claimed in claim 2 wherein
(a) said insert has an annular groove in the upper one third thereof dividing said insert into an upper portion of less than ⅓ the total length and a lower portion of about ⅔ the total length whereby under operating temperatures the diameter of the lower portion will expand into heat exchanging engagement with said outer end,
(b) said expansion ring having a depth of substantially ⅛ the total length of said insert whereby the heat exchange between said insert and said counterbore is not restricted in the critical area of said lower portion of said insert.

6. The combination claimed in claim 5 wherein said lower portion of said insert and said outer end of said counterbore in substantially parallel relationship to each other whereby maximum heat exchange takes place with a minimum amount of stress created.

References Cited in the file of this patent

UNITED STATES PATENTS

| | | |
|---|---|---|
| 2,517,114 | Karcher et al. | Aug. 1, 1950 |
| 2,631,577 | Carter | Mar. 17, 1953 |
| 2,665,675 | Sheppard | Jan. 12, 1954 |
| 2,696,810 | Kuepfer | Dec. 14, 1954 |